United States Patent
Chen (10) Patent No.: US 11,799,987 B2
(45) Date of Patent: Oct. 24, 2023

(54) METHOD FOR RESPONDING TO RESOURCE REQUEST, REDIRECT SERVER, AND DECISION DELIVERY SERVER

(71) Applicant: Xiamen Wangsu Co., Ltd., Fujian (CN)

(72) Inventor: Jiawei Chen, Fujian (CN)

(73) Assignee: Xiamen Wangsu Co., Ltd., Fujian (CN)

( * ) Notice: Subject to any disclaimer, the term of this patent is extended or adjusted under 35 U.S.C. 154(b) by 0 days.

(21) Appl. No.: 17/969,609

(22) Filed: Oct. 19, 2022

(65) Prior Publication Data

US 2023/0038228 A1 Feb. 9, 2023

Related U.S. Application Data

(63) Continuation of application No. PCT/CN2020/103935, filed on Jul. 24, 2020.

(30) Foreign Application Priority Data

Jul. 8, 2020 (CN) .......................... 202010650014.3

(51) Int. Cl.
*H04L 67/63* (2022.01)
*H04L 67/1004* (2022.01)

(52) U.S. Cl.
CPC .......... *H04L 67/63* (2022.05); *H04L 67/1004* (2013.01)

(58) Field of Classification Search
CPC . H04L 67/63; H04L 67/1004; H04L 67/1014; H04L 67/51; H04L 67/60
See application file for complete search history.

(56) References Cited

U.S. PATENT DOCUMENTS

| 9,161,080 B2 | 10/2015 | Crowe et al. |
| 10,115,138 B1 | 10/2018 | Streets et al. |

FOREIGN PATENT DOCUMENTS

| CN | 1581114 A | 2/2005 |
| CN | 102143211 A | 8/2011 |
| CN | 102611756 A | 7/2012 |
| CN | 105100178 A | 11/2015 |
| CN | 105847458 A | 8/2016 |
| CN | 105871773 A | 8/2016 |
| CN | 106161636 A | 11/2016 |

(Continued)

OTHER PUBLICATIONS

Xiamen Wangsu Co., Ltd., CN First Office Action with English translation, CN 202010650014.3, dated Apr. 8, 2021, 11pgs.

(Continued)

*Primary Examiner* — Benjamin M Thieu
(74) *Attorney, Agent, or Firm* — USCH Law, PC (57) ABSTRACT

Embodiments of the present disclosure disclose a method for responding to a resource request, a redirect server, and a decision delivery server. The redirect server classifies a first resource request from a client based on a first screening rule (201), and responds to the first resource request determined to be of an unprocessable type, to enable the client to send a second resource request to the decision delivery server (202). The decision delivery server determines, based on a second screening rule, whether the second resource request from the client is of a serviceable type (203), and performs proxy acceleration for the second resource request if it is determined the second resource request is of the serviceable type (204).

15 Claims, 3 Drawing Sheets

(56) References Cited

FOREIGN PATENT DOCUMENTS

| | | |
|---|---|---|
| CN | 106375265 A | 2/2017 |
| CN | 106487846 A | 3/2017 |
| CN | 106657183 A | 5/2017 |
| CN | 107104997 A | 8/2017 |
| CN | 109040153 A | 12/2018 |
| EP | 2211500 A1 | 7/2010 |
| EP | 2211500 B1 | 1/2016 |

OTHER PUBLICATIONS

Xiamen Wangsu Co., Ltd., CN Intention to Grant with English translation, CN 202010650014.3, dated Jun. 2, 2021, 6pgs.
Xiamen Wangsu Co., Ltd., International Search Report with English translation, PCT/CN2020/103935, dated Mar. 24, 2021, 3pgs.
Xiamen Wangsu Co., Ltd., Extended European Search Report, EP 20944169.0, dated Aug. 22, 2023, 8 pgs.

FIG. 4

# METHOD FOR RESPONDING TO RESOURCE REQUEST, REDIRECT SERVER, AND DECISION DELIVERY SERVER

CROSS REFERENCE TO RELATED APPLICATIONS

The present disclosure is a continuation of PCT Patent Application No. PCT/CN2020/103935, entitled "METHOD FOR RESPONDING TO RESOURCE REQUEST, AND DECISION DELIVERY SERVER," filed Jul. 24, 2020, which claims priority to Chinese Patent Application No. 202010650014.3, entitled "METHOD FOR RESPONDING TO RESOURCE REQUEST, AND DECISION DELIVERY SERVER" filed on Jul. 8, 2020, each of which is incorporated herein by reference in its entirety.

TECHNICAL FIELD

The present disclosure relates to the field of data processing, and in particular, to a method for responding to a resource request, a redirect server, and a decision delivery server.

BACKGROUND

Currently, network service providers may provide network acceleration services for customers, so that requests of the customers may be quickly responded to, thereby improving user experience. In the existing implementation scheme, a network service provider may determine whether to perform proxy acceleration for received traffic by setting a redirect server. Because the redirect server often faces a very large quantity of users, when the received traffic is overloaded, the redirect server may crash due to excessive pressure, or slow down processing of user traffic, resulting in a traffic-jam at the redirect server and a failure to make a timely response, which affects user experience.

Accordingly, how to reduce the load pressure of a redirect server has become an urgent problem to be resolved in the industry.

SUMMARY

Some embodiments of the present disclosure provide a method for responding to a resource request, a redirect server, and a decision delivery server, to quickly obtain a resource request from a client.

Some embodiments of the present disclosure provide a method for responding to a resource request, including: classifying, by a redirect server, a first resource request from a client based on a first screening rule, where a classification result includes a processable type and an unprocessable type; responding to a first resource request determined to be of the unprocessable type, to enable the client to send a second resource request to a decision delivery server; determining, by the decision delivery server based on a second screening rule, whether the second resource request from the client is of a serviceable type; and performing proxy acceleration for the second resource request if it is determined that the second resource request is of the serviceable type, where a length of time consumed for executing the second screening rule is longer than a length of time consumed for executing the first screening rule.

Based on this solution, the redirect server first classifies the first resource request from the client based on the first screening rule, and responds to the first resource request of which the classification result belongs to an unprocessable type, to enable the client to redirect to the decision delivery server and further request a resource from the decision delivery server, that is to send the second resource request. Subsequently, the decision delivery server determines, based on the second screening rule, whether the second resource request from the client is of a serviceable type, and performs proxy acceleration for the second resource request determined to be of the serviceable type. A length of time consumed for executing the second screening rule is longer than a length of time consumed for executing the first screening rule. In this solution, the redirect server roughly classifies the first resource request by using a determining rule that consumes less time, some resource requests can be quickly screened out and handed over to the decision delivery server for processing, thereby reducing the processing pressure of the redirect server and quickly responding to a resource request.

In an embodiment, the first screening rule includes a field query; and the second screening rule includes regular expression matching.

Based on this solution, the redirect server identifies the first resource request through the field query, so that whether the first resource request is of the processable type or the unprocessable type can be quickly determined. In this embodiment, the decision delivery server performs regular expression matching to ensure the accuracy of secondary identification, so that whether a resource request is serviceable can be accurately determined.

In an embodiment, the classifying, by a redirect server, a first resource request from a client based on a first screening rule includes: obtaining, by the redirect server after resolving the first resource request, a requested domain name from the first resource request, matching the requested domain name with a preset name list, and determining a classification of the first resource request based on a matching result.

Based on this solution, during the process that the redirect server classifies the first resource request from the client based on the first screening rule, the requested domain name from the first resource request is obtained after the first resource request is resolved, the obtained requested domain name is matched with a preset name list. Therefore, the redirect server may perform preliminary determining on the first resource request, that is, classify the first resource request into the processable type or the unprocessable type, and perform respective processing on the resource request belong to the respective type.

In an embodiment, the preset name list includes a blacklist, the blacklist includes a domain name that is refused to be provided with a service, and if the requested domain name is recorded in the blacklist, it is determined that the first resource request is of the processable type, and the first resource request is discarded.

Based on this solution, domain names that is refused to be provided with a service are edited in a preset name list, which is used as the blacklist. Therefore, after the redirect server resolves the first resource request, if the requested domain name obtained after the resolution is in the blacklist, the redirect server may determine the first resource request to be of the processable type, and discard the first resource request.

In an embodiment, the preset name list includes a whitelist, the whitelist includes a domain name capable of providing a service, and if the requested domain name is recorded in the whitelist, it is determined that the first resource request is of the processable type, and proxy acceleration is performed for the first resource request.

Based on this solution, domain names capable of providing a service are edited in a preset name list, which is used as the whitelist. Therefore, after the redirect server resolves the first resource request, if the requested domain name obtained after the resolution is in the whitelist, the redirect server may determine the first resource request to be of a processable type, and perform proxy acceleration for the first resource request.

In an embodiment, the performing, by the redirect server, proxy acceleration for the first resource request includes: masquerading, by the redirect server, as a source station of the first resource request, constructing an acceleration redirection message, and sending the acceleration redirection message to the client, where the acceleration redirection message is used for instructing the client to request a resource from a cache server.

Based on this solution, if the redirect server determines the first resource request to be of the processable type according to the whitelist in a preset name list, the redirect server masquerades as the source station of the first resource request, constructs the acceleration redirection message and sends the acceleration redirection message to the client, to instruct the client to request a resource from the cache server, so that the cache server feeds back the requested resource to the client, to implement cache acceleration.

In an embodiment, the preset name list includes a fuzzy list, and if the requested domain name is recorded in the fuzzy list, it is determined that the first resource request is of the unprocessable type.

Based on this solution, domain names of an unprocessable type are edited in a preset name list, which is used as the fuzzy list. Therefore, after the redirect server resolves the first resource request, and if the requested domain name obtained after the resolution is in the fuzzy list, the redirect server may determine the first resource request to be of the unprocessable type, and further respond to the first resource request, to enable the client to send the second resource request to the decision delivery server.

In an embodiment, the classifying, by a redirect server, a first resource request from a client based on a first screening rule includes: determining, by the redirect server after resolving the first resource request, whether the first resource request includes an anti-stealing-link, and if yes, determining that the first resource request is of the unprocessable type. Alternately, the classifying, by a redirect server, a first resource request from a client based on a first screening rule includes: obtaining, by the redirect server after resolving the first resource request, a requested domain name from the first resource request; and determining that the first resource request is of the unprocessable type, if the requested domain name is an IP address and the first resource request includes an anti-stealing-link.

Based on this solution, during the process that the redirect server classifies the first resource request from the client based on the first screening rule, in addition to using a method of matching a requested domain name with a preset name list, the resource type of the first resource request may be classified by determining whether the first resource request includes the anti-stealing-link. If the anti-stealing-link is included, the first resource request may be determined as a resource request of the unprocessable type. In this embodiment, if the requested domain name obtained by resolving the first resource request is an IP address, and the first resource request includes the anti-stealing-link, the first resource request may also be determined as a resource request of the unprocessable type.

In an embodiment, the responding to the first resource request determined to be of the unprocessable type includes: masquerading, by the redirect server, as a source station of the first resource request, constructing a decision redirection message, and sending the decision redirection message to the client, where the decision redirection message is used for instructing the client to send a second resource request to the decision delivery server.

Based on this solution, if the first resource request is determined by the redirect server as a resource request of the unprocessable type, the redirect server masquerades as the source station of the first resource request, constructs the decision redirection message, and sends the decision redirection message to the client, to instruct the client to send the second resource request to the decision delivery server, and the client automatically sends the second resource request to the decision delivery server after receiving the decision redirection message.

In an embodiment, the performing proxy acceleration for the second resource request includes: forwarding, by the decision delivery server, the second resource request to a corresponding cache server, and feeding back, to the client, a resource with which the cache server responds. Alternately, the performing proxy acceleration for the second resource request includes: requesting a resource from a source station based on an acceleration path, and feeding back, to the client, a resource with which the source station responds.

Based on this solution, after the decision delivery server determines that the second resource request is of a serviceable type, and if the decision delivery server confirms that content with which the second resource request is responded to exists in the cache server, the decision delivery server may forward the second resource request to the corresponding cache server, and feeds back, to the client, the content with which the cache server responds to the second resource request. If the decision delivery server confirms that content with which the second resource request is responded to does not exist in the cache server, the decision delivery server may request a resource from the source station based on the acceleration path, and feeds back, to the client, content with which the source station responds to the second resource request.

In an embodiment, if it is determined that the second resource request is of an unserviceable type, a resource is requested from a source station based on a default path, and a resource with which the source station responds is fed back to the client. Alternately, the client is responded to with a secondary redirection message, to enable the client to send a third resource request to the source station, where a uniform resource identifier (URI) of the third resource request carries an identifier, and the identifier is used for instructing the redirect server to discard the third resource request.

Based on this solution, after determining that the second resource request is of the unserviceable type, the decision delivery server requests a resource from the source station based on the default path, and feeds back, to the client, content with which the source station to responds to the second resource request. Alternatively, the decision delivery server responds to the client with the secondary redirection message, to enable the client to directly send the third resource request to a source station, where a URI of the third resource request carries the identifier, and the redirect server discards the third resource request when the identifier is detected.

Some embodiments of the present disclosure further provide a redirect server, at least including a memory and a processor, where the memory is configured to store program instructions; and the processor is configured to call the program instructions stored in the memory, and implement a following method by executing obtained program instructions: classifying a first resource request from a client based on a first screening rule, where a classification result includes a processable type and an unprocessable type; and responding to a first resource request determined to be of the unprocessable type, to enable the client to send a second resource request to a decision delivery server, where the decision delivery server responds to the second resource request.

The embodiments of the present disclosure further provide a decision delivery server, at least including a memory and a processor, where the memory is configured to store program instructions; and the processor is configured to call the program instructions stored in the memory, and implement a following method by executing obtained program instructions: determining, by the decision delivery server based on a second screening rule, whether a second resource request from a client is of a serviceable type, where the second resource request is initiated by the client based on a redirection message sent from a redirect server; and performing proxy acceleration for the second resource request if it is determined that the second resource request is of the serviceable type.

Some embodiments of the present disclosure further provide a network service system, including: a redirect server and a decision delivery server, where the redirect server is configured to classify a first resource request from a client based on a first screening rule, where a classification result includes a processable type and an unprocessable type, and respond to a first resource request determined to be of the unprocessable type, to enable the client to send a second resource request to a decision delivery server; and the decision delivery server is configured to determine, based on a second screening rule, whether the second resource request from the client is of a serviceable type, and perform proxy acceleration for the second resource request if it is determined that the second resource request is of the serviceable type, where a length of time consumed for executing the second screening rule is longer than a length of time consumed for executing the first screening rule.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the present disclosure in detail with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
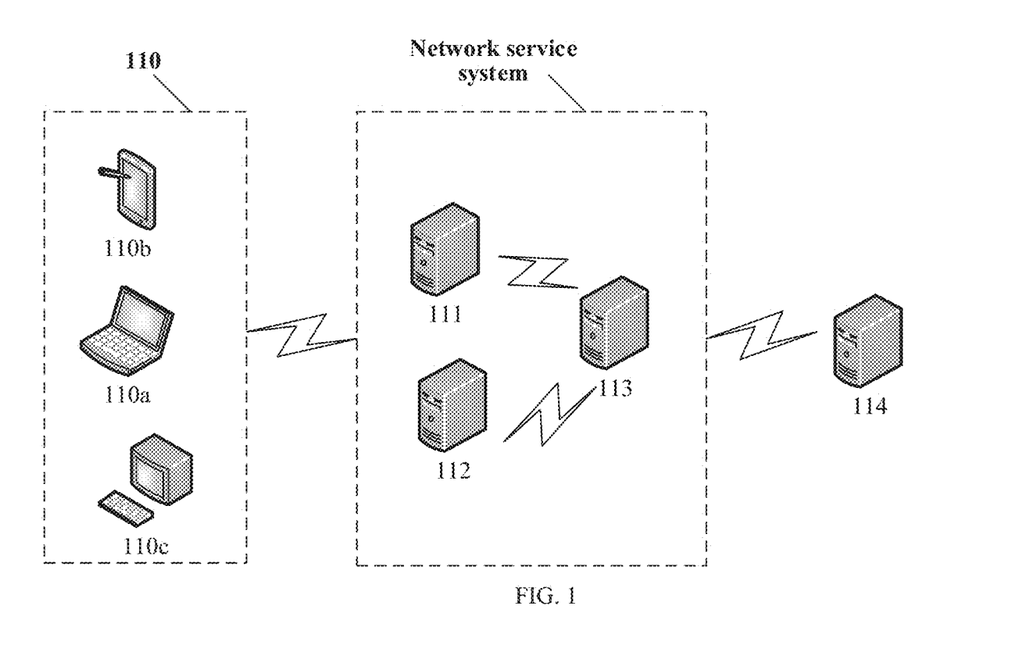
FIG. 1 shows a possible system architecture according to an embodiment of the present disclosure.

FIG. 1 shows a possible system architecture according to an embodiment of the present disclosure. The system architecture includes a client 110 (110a, 110b, and 110c in the figure), at least one redirect server 111, at least one decision delivery server 112, at least one cache server 113 and a source station server 114. The redirect server 111, the decision delivery server 112, and the cache server 113 may constitute a network service system to implement proxy acceleration for the client 110.

The client 110 may include smart terminal devices such as a mobile phone and a computer, and a user may obtain various resources, such as video resources and image resources, through the client.

The redirect server 111 and the decision delivery server 112 may identify a received client request to determine whether proxy acceleration needs to be performed on the client request. It may be understood that whether to perform proxy acceleration for traffic depends on an actual service requirement. For example, if a customer (such as an operator) subscribes to a video traffic acceleration service, the acceleration service shall be provided for a customer request identified by the redirect server 111 and the decision delivery server 112 as video traffic. A network service provider may set an identifying rule according to a service requirement of a customer to satisfy different service scenarios.

The cache server 113 is configured to cache a resource requested by the client, to quickly respond to a request for a cached resource.

The source station server 114 is deployed by a service provider to provide a content resource for a user.

The client 110, the redirect server 111, the decision delivery server 112, the cache server 113, and the source station server 114 may communicate with each other based on a network.

Figure 2:
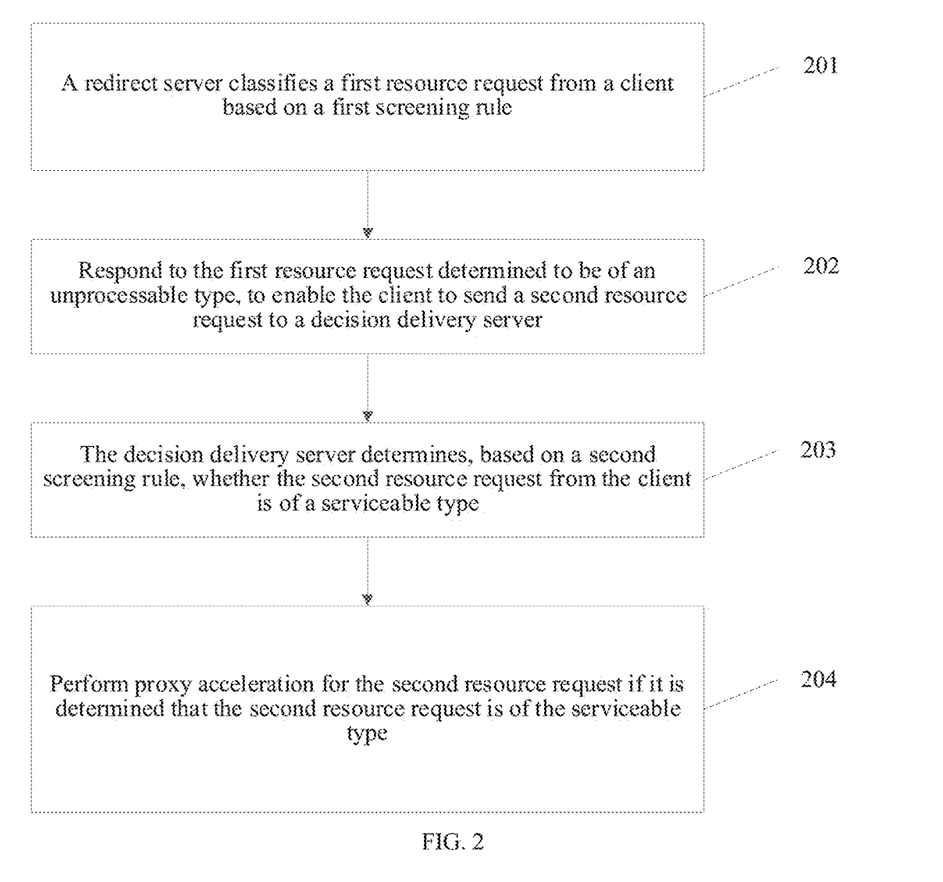
FIG. 2 shows a method for responding to a resource request according to an embodiment of the present disclosure.

Based on the system architecture shown in FIG. 1, an embodiment of the present disclosure provides a method for responding to a resource request. As shown in FIG. 2, the method includes the following steps.

Step 201: A redirect server classifies a first resource request from a client based on a first screening rule.

During implementation, first resource requests sent from all clients arrive at a network egress of an operator first, and the operator may mirror all requested traffic (the first resource requests) from the network egress to the redirect server. The redirect server identifies all the request traffic to determine request traffic for which an acceleration service needs to be provided. Specifically, the redirect server may first classify the received first resource request based on the first screening rule, and a classification result may include a processable type and an unprocessable type. The first resource request of the processable type indicates that the redirect server has determined whether to perform proxy acceleration for the resource request, and may directly perform processing thereon. The first resource request of the unprocessable type indicates that the redirect server cannot directly determine whether to perform proxy acceleration for the resource request, and therefore, cannot directly perform processing. It is worth noting that the redirect server may be deployed at the network egress of the operator, to quickly receive the first resource request transferred from the network egress.

Step 202: Respond to the first resource request determined to be of an unprocessable type, to enable the client to send a second resource request to a decision delivery server.

During implementation, the first resource request determined to be of the unprocessable type needs to be further identified by the decision delivery server to finally determine whether to provide an acceleration service for the first resource request determined to be of the unprocessable type. The redirect server may first respond to the first request, and the response content may include a 301/302 redirect message, to instruct the client to request a resource from the decision delivery server.

Step 203: The decision delivery server determines, based on a second screening rule, whether the second resource request from the client is of a serviceable type.

Step 204: Perform proxy acceleration for the second resource request if it is determined that the second resource request is of the serviceable type.

Based on this solution, a redirect server quickly classifies the first resource request from the client based on the first screening rule, and responds to the first resource request of which a classification result belongs to the unprocessable type, to enable the client to send the second resource request to the decision delivery server. When receiving the second resource request from the client, the decision delivery server may determine, based on the second screening rule, whether the second resource request is classified as a resource request of a serviceable type, and perform proxy acceleration for the second resource request belonging to the serviceable type. In this case, redirecting a request of the unprocessable type to the decision delivery server can reduce the processing pressure of the redirect server.

In the foregoing method, a length of time consumed for executing the second screening rule may be longer than a length of time consumed for executing the first screening rule. A resource request whose type needs to be determined based on the second screening rule is redirected to the decision delivery server for processing, which can further reduce a time that the redirect server spends on processing the resource request, so that the first resource request can be quickly responded to.

During implementation, the first screening rule may be field-based matching, and the second screening rule may be regular expression matching, that is, determining, by using a regular expression, whether a uniform resource locator (URL) includes target content.

The foregoing steps are described below separately.

For step 201, during implementation, the first resource request received by the redirect server from the client may be directly sent from the client to the redirect server, or the operator forwards or mirrors and sends the received first resource request from the client to the redirect server.

During implementation, the redirect server classifies a first resource request from the client based on the first screening rule may specifically include: the redirect server may resolve the first resource request to obtain a requested domain name, match the requested domain name with a preset name list, and determine a classification result of the first resource request based on a matching result.

Specifically, a preset name list may be set first according to a service requirement. When receiving the first resource request from the client, the redirect server first resolves the first resource request to convert received binary data into a corresponding character string, extracts content of a specific field, and identifies the content as corresponding characteristic information. Using a TCP/IP four-layer reference model as an example, when a first resource request arrives at the redirect server, the first resource request sequentially passes through a network access layer, an internetwork layer, and a transport layer, and finally arrives at an application layer. Each layer may obtain corresponding message content from a corresponding field of a string obtained through resolution. In addition, based on a format characteristic of each message, characteristic information in the message may be quickly obtained. For example, a destination IP address may be obtained at the internetwork layer, and a requested domain name may be obtained at the application layer. After obtaining the corresponding characteristic information, for example, a requested domain name in this embodiment, the redirect server may match the characteristic information with the preset name list to determine a classification.

Because resolution of a request is an inherent processing procedure, and a length of processing time consumed for obtaining a requested domain name from a specific field and matching the requested domain name with a preset name list is generally relatively short. Accordingly, the redirect server identifies, based on the first screening rule, whether the first resource request is processable very quickly. When identifying a first resource request of the unprocessable type, the redirect server may quickly respond to the first resource request, to enable a client to send a second resource request to the decision delivery server.

In an embodiment, the preset name list may include a blacklist, the blacklist includes a domain name that is refused to be provided with a service, and if the requested domain name is recorded in the blacklist, it is determined that the first resource request is of the processable type, and the first resource request is discarded.

In an embodiment, the preset name list may include a whitelist, the whitelist includes a domain name capable of providing a service, and if the requested domain name is recorded in the whitelist, it is determined that the first resource request is of the processable type, and proxy acceleration is performed for the first resource request.

The redirect server may perform proxy acceleration for the first resource request in the following two manners.

First, proxy acceleration is implemented based on a cache server.

Specifically, the redirect server may serve as a source station (that is, a source station server corresponding to a destination address) of the first resource request, construct an acceleration redirection message, and send the acceleration redirection message to the client. The acceleration redirection message is used for instructing the client to request a resource from a cache server. The acceleration redirection message may be a 301/302 message. After receiving the acceleration redirection message, a client browser automatically sends a resource request to the cache server, so that the cache server can provide proxy acceleration for the resource request.

Second, proxy acceleration is implemented based on path selection.

Specifically, the redirect server may select an acceleration path based on a destination IP address, a domain name, or resource content of the first resource request, perform back-to-source based on the acceleration path to obtain a resource requested by the client, and responds to the client with the obtained requested resource.

In an embodiment, the preset name list includes a fuzzy list, and if the requested domain name is recorded in the fuzzy list, it is determined that the first resource request is of the unprocessable type.

It is worth noting that in this embodiment of the present disclosure, the foregoing various lists may be selectively used. That is, the redirect server may identify a resource request based on one or more of the lists. Settings may be made according to actual requirements, and are not limited in the present disclosure. In addition, for the settings of the foregoing various lists, collections and updates may be made based on actual service requirements, to respond to changes in service requirements in real time.

During implementation, the redirect server classifies a first resource request from a client based on a first screening rule may specifically include that: the redirect server may resolve the first resource request and determine whether the first resource request includes an anti-stealing-g-link; and if yes, the redirect server may determine that the first resource request is of the unprocessable type. As stated above, after receiving the first resource request, the redirect server resolves the first resource request to convert the first resource request into a character string that can be easily identified. In this embodiment, whether the character string includes "?" may first be identified directly to determine whether the first resource request includes the anti-stealing-link. The first resource request including "?" that is, including the anti-stealing-link, may be directly determined to be of an unprocessable type. In this way, the first resource request may be identified faster, and the first resource request of this type is transferred to the decision delivery server for processing, so that the processing pressure of the redirect server can be shared.

For example, the redirect server may obtain a URL after resolving the first resource request. If the URL includes "?", it indicates that the first resource request carries an anti-stealing-link. For example, for a UTRL: http://1.1.1.1/?src=lm&ls=n2b2986f18b, a requested domain name is an IP address 1.1.1.1, and the URL includes an anti-stealing-link identifier "?", thus, the resource request may be determined by the redirect server to be of an unprocessable type.

In an embodiment, the redirect server classifies a first resource request from the client based on the first screening rule may specifically include: the redirect server may resolve the first resource request to obtain a requested domain name, and determine, if the requested domain name is an IP address, that the first resource request is of the unprocessable type. That is because if domain name information in a URL is an IP address, the redirect server cannot identify the domain name information according to a preset name list, the first resource request may be directly determined to be of an unprocessable type.

In an embodiment, the redirect server classifies a first resource request from the client based on the first screening rule may specifically include: the redirect server may resolve the first resource request to obtain a requested domain name, and determine, if the requested domain name is an IP address and the first resource request includes an anti-stealing-link, that the first resource request is of the unprocessable type. That is because if domain name information in a URL is an IP address, the redirect server cannot identify the domain name information according to a preset name list, the first resource request may be directly determined to be of an unprocessable type. Since there is a large number of requests from clients, in some application scenarios, to quickly perform proxy acceleration for a target request, some resource requests that are difficult to identify may be selectively discarded to reduce the pressure of a network service system. In this embodiment, if the requested domain name is an IP address and includes an anti-stealing-link, the redirect server determines the request to be of an unprocessable type. In other words, if the requested domain name is an IP address, but does not include an anti-stealing-link, the redirect server may directly discard the request, thereby reducing the processing pressure.

In step 203, when receiving the second resource request from the client, the decision delivery server may determine, according to the second screening rule, whether the second resource request is a resource request of a serviceable type or a resource request of an unserviceable type. In an implementation, the second screening rule includes regular expression matching.

The following will give an example on how the decision delivery server determines, by using regular expression matching, a type to which the second resource request belongs.

For example, in a scenario in which video traffic needs to be accelerated, the decision delivery server needs to determine, by determining whether a URL of a second resource request includes a video file identifier, whether to perform proxy acceleration for the second resource request. In a simple example, whether the second resource request is of a serviceable type may be determined according to whether a URL includes ".mp4". Since positions of ".mp4" in different URLs are greatly different, the determining may not be performed by intercepting a specific field. Therefore, the determining shall be implemented based on regular expression matching. It is well-known to a person skilled in the art that in a process of performing regular expression matching, the matching needs to be started from the first character of a URL and performed in sequence. The processing is completed until the matching succeeds or the matching is completed. In view of the above, this procedure is time-consuming. Furthermore, when the video traffic is identified, not only an identification feature ".mp4" is included, but also other types of identification features may be included; in this case, understandably, if regular expression matching is implemented on the features sequentially, consumed processing time is very long.

In view of the above, in this embodiment of the present disclosure, a decision delivery server is added, and the decision delivery server is used to determine a type to which a resource request belongs by executing a regular expression matching rule that is more time-consuming, which can share the processing pressure of a redirect server to a large extent. Moreover, the redirect server can quickly screen resource requests through some simple rules (such as a preset name list, field matching of an anti-stealing-link), to quickly respond to a client.

For step 204, after the decision delivery server determines, according to the second screening rule, the second resource request to be of a serviceable type, the decision delivery server accelerates the second resource request. Similarly, the decision delivery server may also accelerate the second resource request in the following two manners.

First, acceleration is implemented based on a cache server.

Specifically, the decision delivery server may forward the second resource request to a corresponding cache server, and feedback, to the client, a resource with which the cache server responds, to implement cache acceleration.

Second, acceleration is implemented based on path selection.

Specifically, the decision delivery server may select an acceleration path based on resource content of the second resource request, perform back-to-source based on the acceleration path to obtain a resource requested by a client, and respond to the client with the obtained requested resource.

The decision delivery server may select one of the two acceleration manners according to the requested resource content.

During implementation, when the decision delivery server accurately classifies the second resource request according to the second screening rule, it is also possible that the decision delivery server determines the second resource request to be of an unserviceable type. That is, the second resource request is not a request for which an acceleration service needs to be provided. For example, the request does not belong to video traffic. In this case, the decision delivery server may select one of the following manners to process the second resource request.

First manner: The decision delivery server forwards the second resource request to the source station server through the default path. The source station server responds to the second resource request, and sends, to the decision delivery server, a resource with which the source station server responds. After receiving the resource with which the source station server responds to the second resource request, the decision delivery server feeds back, to the client, the resource with which the source station server responds.

Second manner: The decision delivery server may respond to the client with a secondary redirection message (because the redirect server has sent a decision redirection message to the client before, a redirection message sent by the decision delivery server to the client may be referred to as a secondary redirection message herein). The secondary redirection message may be used for instructing the client browser to automatically send a third resource request to the source station server to request resource content, and enabling a URI of the third resource request to carry an identifier, where the identifier is used for instructing the redirect server to discard the third resource request.

During implementation, when constructing the secondary redirection message, the decision delivery server may enable, in a manner of setting set-cookie, the client browser to automatically add a corresponding cookie value to the third resource request that is sent. When receiving the resource request carrying the corresponding cookie value, the redirect server may directly discard the request.

During implementation, if the second resource request carries an anti-stealing-link, the decision delivery server may add an identifier following the anti-stealing-link when constructing the secondary redirection message, and enable the URI of the third resource request to carry the identifier. When receiving a resource request carrying the identifier in the URI, the redirect server may directly discard the request.

Based on the method for responding a resource request provided in the foregoing embodiments, some resource requests may be redirected to the decision delivery server for processing, which can effectively reduce the load pressure of the redirect server and release processing resources. Therefore, accumulation of request traffic at the redirect server is reduced, and thus processing efficiency of the redirect server on the resource requests is improved. Particularly, if traffic requests suddenly surge, an effect of optimizing the processing efficiency of the redirect server through pressure-sharing is reflected better. In addition, execution of the second screening rule that consumes more processing time is transferred to the decision delivery server for processing, and the redirect server just execute the first screening rule that consumes less time, so that a time in which the redirect server processes a single resource request is optimized, thereby implementing a quick response and improving user experience.

Figure 3:
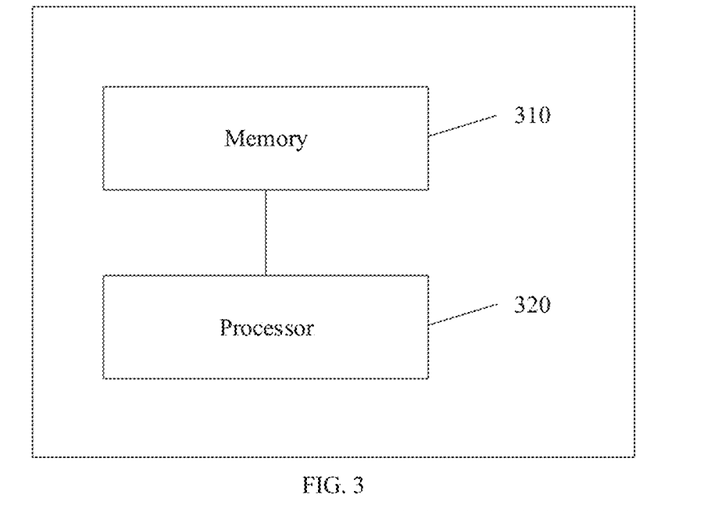
FIG. 3 shows a redirect server according to an embodiment of the present disclosure.

Based on the same conception, some embodiments of the present disclosure provide a redirect server, which may be referred to the redirect server 111 in the system shown in FIG. 1. As shown in FIG. 3, the redirect server at least includes a memory 310 and a processor 320. The memory is configured to store program instructions. The processor is configured to call the program instructions stored in the memory, and at least implement the following method by executing the obtained program instructions: a first resource request from a client is classified based on a first screening rule, where a classification result includes a processable type and an unprocessable type; and response is made to the first resource request determined to be of the unprocessable type, to enable the client to send a second resource request to a decision delivery server, where the decision delivery server responds to the second resource request.

It is worth noting that, for a specific method that can be implemented by the redirect server in this embodiment, refer to the corresponding description in the foregoing method embodiments. Details are not repeated again.

Figure 4:
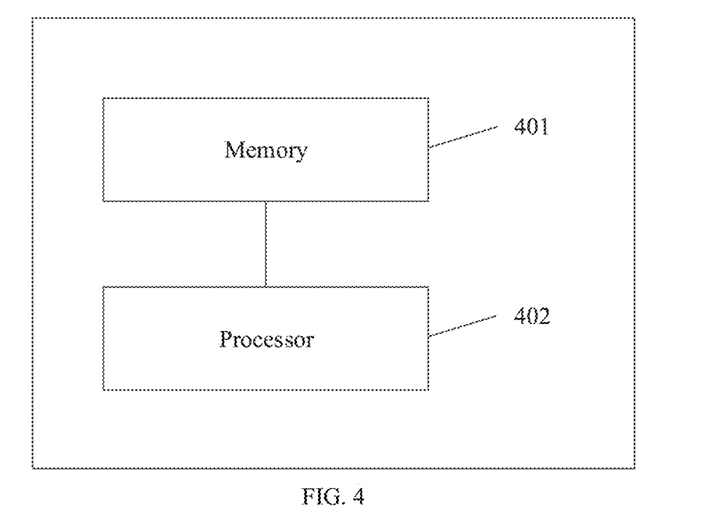
FIG. 4 shows a decision delivery server according to an embodiment of the present disclosure.

Based on the same conception, some embodiments of the present disclosure further provide a decision delivery server, which may be referred to the decision delivery server 112 in the system shown in FIG. 1. As shown in FIG. 4, the decision delivery server at least includes a memory 401 and a processor 402. The memory is configured to store program instructions. The processor is configured to call the program instructions stored in the memory, and implements at least the following method by executing an obtained program instructions: the decision delivery server determines, based on a second screening rule, whether a second resource request from a client is of a serviceable type, where the second resource request is initiated by the client based on a redirection message sent from a redirect server; and proxy acceleration is performed for the second resource request if it is determined that the second resource request is of the serviceable type.

It is worth noting that, for a specific method that can be implemented by the decision delivery server in this embodiment, refer to the corresponding description in the foregoing method embodiment. Details are not repeated again.

Based on the same conception, some embodiments of the present disclosure provide a network service system. Referring to the network service system in FIG. 1, the system includes at least one redirect server 111, at least one decision delivery server 112, and at least one cache server 113, where the servers may communicate with each other based on a network.

The redirect server may be configured to classify a first resource request from a client based on a first screening rule, where a classification result includes a processable type and an unprocessable type, and respond to the first resource request determined to be of the unprocessable type, to enable the client to send a second resource request to a decision delivery server.

The decision delivery server may be configured to determine, based on a second screening rule, whether the second resource request from the client is of a serviceable type, and perform proxy acceleration for the second resource request if it is determined that the second resource request is of the serviceable type, where a length of time consumed for executing the second screening rule is longer than a length of time consumed for executing the first screening rule.

The cache server is configured to provide a cache acceleration service for a received resource request.

For the methods that can be implemented by the servers in this embodiment, refer to the descriptions in the foregoing method embodiment. Details are not repeated again.

Some embodiments of the present disclosure further provide a computing device. The computing device may be specifically a desktop computer, a portable computer, a smart phone, a tablet computer, a personal digital assistant (PDA), or the like. The computing device may include a center processing unit (CPU), a memory, an input/output device, and the like. The input device may include a keyboard, a mouse, a touch screen, and the like. The output device may include a display device such as a liquid crystal display (LCD) or a cathode ray tube (CRT).

The memory may include a read-only memory (ROM) and a random access memory (RAM), and provide program instructions and data stored in the memory for the processor. In the embodiments of the present disclosure, the memory may be configured to store program instructions of the method for responding to the resource request; and the processor may be configured to call the program instructions stored in the memory, and perform the method for responding to the resource request according to obtained program instructions.

Some embodiments of the present disclosure further provide a computer-readable storage medium. The computer-readable storage medium stores computer executable instructions, and the computer executable instructions are used for causing a computer to perform the method for responding to the resource request.

A person skilled in the art should understand that the embodiments of the present disclosure may be provided as a method or a computer program product. Therefore, the present disclosure may use a form of total hardware embodiments, total software embodiments, or embodiments combining software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to flowcharts and/or block diagrams of the method, the device (system), and the computer program product according to the embodiments of the present disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of other programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or other programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or other programmable data processing device, so that a series of operation steps are performed on the computer or other programmable data processing device to generate processing implemented by a computer, and instructions executed on the computer or another programmable data processing device provide steps for implementing functions specified in one or more procedures in the flowcharts and/or one or more blocks in the block diagrams.

Although preferable embodiments of the present disclosure have been described, once a person skilled in the art learns of the basic creative concept, additional changes and modifications may be made to the embodiments. Therefore, the following claims intend to cover the preferable embodiments and all changes and modifications falling within the scope of the present disclosure.

Certainly, a person skilled in the art can make various modifications and variations to the present disclosure without departing from the spirit and scope of the present disclosure. In this case, if the modifications and variations made to the present disclosure fall within the scope of the claims of the present disclosure and their equivalent technologies, the present disclosure intends to include these modifications and variations.

What is claimed is:

1. A method for responding to a resource request, comprising:
    executing, by a redirect server, a first screening rule to classify a first resource request from a client to obtain a classification result, wherein the classification result is one of at least a processable type and an unprocessable type;
    in response to the first resource type being of the unprocessable type, enabling the client to send a second resource request to a decision delivery server;
    executing, by the decision delivery server, a second screening rule to determine whether the second resource request from the client is of a serviceable type; and
    performing proxy acceleration for the second resource request in response to the second resource request being of the serviceable type, wherein
    a length of time consumed for executing the second screening rule is longer than a length of time consumed for executing the first screening rule.

2. The method according to claim 1, wherein the first screening rule comprises a field query; and the second screening rule comprises regular expression matching.

3. The method according to claim 1, wherein the classifying, by a redirect server, a first resource request from a client based on a first screening rule comprises:
    obtaining, by the redirect server after resolving the first resource request, a requested domain name from the first resource request, matching the requested domain name with a preset name list, and determining a classification of the first resource request based on a matching result.

4. The method according to claim 3, wherein the preset name list comprises a blacklist, the blacklist comprises a domain name that is refused to be provided with a service, and if the requested domain name is recorded in the blacklist, it is determined that the first resource request is of the processable type, and the first resource request is discarded.

5. The method according to claim 3, wherein the preset name list comprises a whitelist, the whitelist comprises a domain name capable of providing a service, and if the requested domain name is recorded in the whitelist, it is determined that the first resource request is of the processable type, and proxy acceleration is performed for the first resource request.

6. The method according to claim 5, wherein performing, by the redirect server, proxy acceleration for the first resource request comprises:
   masquerading, by the redirect server, as a source station of the first resource request, constructing an acceleration redirection message, and sending the acceleration redirection message to the client, wherein the acceleration redirection message is used for instructing the client to request a resource from a cache server.

7. The method according to claim 5, wherein performing, by the redirect server, proxy acceleration for the first resource request comprises:
   selecting, by the redirect server, an acceleration path based on a destination IP address, a domain name, or resource content of the first resource request, performing back-to-source based on the acceleration path to obtain a resource requested by the client, and responding to the client with the obtained requested resource.

8. The method according to claim 3, wherein the preset name list comprises a fuzzy list, and if the requested domain name is recorded in the fuzzy list, it is determined that the first resource request is of the unprocessable type.

9. The method according to claim 1, wherein the classifying, by a redirect server, a first resource request from a client based on a first screening rule comprises:
   determining, by the redirect server after resolving the first resource request, whether the first resource request comprises an anti-stealing-link, and if yes, determining that the first resource request is of the unprocessable type;
   or,
   obtaining, by the redirect server after resolving the first resource request, a requested domain name from the first resource request, and determining, if the requested domain name is an IP address and the first resource request comprises an anti-stealing-link, that the first resource request is of the unprocessable type.

10. The method according to claim 1, wherein the responding to the first resource request determined to be of the unprocessable type comprises:
    masquerading, by the redirect server, as a source station of the first resource request, constructing a decision redirection message, and sending the decision redirection message to the client, wherein the decision redirection message is used for instructing the client to send a second resource request to the decision delivery server.

11. The method according to claim 1, wherein the performing proxy acceleration for the second resource request comprises:
    forwarding, by the decision delivery server, the second resource request to a corresponding cache server; and, feeding back, to the client, a resource with which the cache server responds;
    or,
    requesting a resource from a source station based on an acceleration path; and feeding back, to the client, a resource with which the source station responds.

12. The method according to claim 1, further comprising:
    requesting, if it is determined that the second resource request is of an unserviceable type, a resource from a source station based on a default path; and feeding back, to the client, a resource with which the source station responds;
    or,
    responding to the client with a secondary redirection message, to enable the client to send a third resource request to the source station; wherein a uniform resource identifier of the third resource request is configured to carry an identifier, and the identifier is used for instructing the redirect server to discard the third resource request.

13. The method according to claim 1, wherein the first resource request of the processable type is configured to indicate that the redirect server has determined whether to perform proxy acceleration for the first resource request, and directly perform processing thereon; the first resource request of the unprocessable type is configured to indicate that the redirect server cannot directly determine whether to perform proxy acceleration for the first resource request, and processing cannot be directly performed.

14. A redirect server, at least comprising a memory and a processor, wherein the memory is configured to store program instructions; and the processor is configured to call the program instructions stored in the memory, and implement a following method by executing obtained program instructions:
    classifying a first resource request from a client based on a first screening rule, wherein a classification result comprises a processable type and an unprocessable type; and
    responding to a first resource request determined to be of the unprocessable type, to enable the client to send a second resource request to a decision delivery server; wherein the decision delivery server responds to the second resource request.

15. A decision delivery server, at least comprising a memory and a processor, wherein the memory is configured to store program instructions; and the processor is configured to call the program instructions stored in the memory, and implement a following method by executing obtained program instructions:
    determining, by the decision delivery server based on a second screening rule, whether a second resource request from a client is of a serviceable type, wherein the second resource request is initiated by the client based on a redirection message sent from a redirect server; and
    performing proxy acceleration for the second resource request if it is determined that the second resource request is of the serviceable type.

* * * * *